United States Patent
Trachtman et al.

(10) Patent No.: US 7,634,268 B2
(45) Date of Patent: Dec. 15, 2009

(54) SYSTEM AND METHOD FOR PROVIDING BROADCAST SIGNALS TO AIRCRAFT

(75) Inventors: Eyal Trachtman, London (GB); Johnny Nemes, London (GB)

(73) Assignee: Inmarsat Global Limited, London (GB)

( * ) Notice: Subject to any disclaimer, the term of this patent is extended or adjusted under 35 U.S.C. 154(b) by 1817 days.

(21) Appl. No.: 10/021,249

(22) Filed: Dec. 19, 2001

(65) Prior Publication Data

US 2003/0008651 A1    Jan. 9, 2003

(30) Foreign Application Priority Data

Dec. 21, 2000    (GB) ................................ 0031323.9

(51) Int. Cl.
*H04W 4/00* (2006.01)
*H04N 7/18* (2006.01)
(52) U.S. Cl. ...................... 455/431; 455/430; 455/12.1; 455/556.1
(58) Field of Classification Search ................. 455/556, 455/430, 431, 12.1, 427, 3.02, 428, 3.06; 725/76, 72; 343/705, 708, 757
See application file for complete search history.

(56) References Cited

U.S. PATENT DOCUMENTS

| | | | |
|---|---|---|---|
| 5,760,819 A | 6/1998 | Sklar et al. | |
| 5,835,057 A | 11/1998 | van Heyningen | |
| 5,929,895 A | 7/1999 | Berry et al. | |
| 5,966,442 A | 10/1999 | Sachdev | |
| 5,990,928 A * | 11/1999 | Sklar et al. | 725/72 |
| 6,522,865 B1 * | 2/2003 | Otten | 455/13.1 |
| 6,741,841 B1 * | 5/2004 | Mitchell | 455/188.1 |
| 6,810,527 B1 * | 10/2004 | Conrad et al. | 725/76 |

FOREIGN PATENT DOCUMENTS

| | | |
|---|---|---|
| GB | 2324395 A | 10/1998 |
| GB | 2347051 A | 8/2000 |
| WO | WO 98/47249 | 10/1998 |
| WO | WO 00/36798 | 6/2000 |
| WO | WO 02/15582 A1 | 2/2002 |

OTHER PUBLICATIONS

Losquadro, G., "Abate: Aeronautical Satellite Communications For On Multimedia Services", *Ecsc. European Conf. On Satellite Communications. Proceedings of European Conference On Satellite Communications*, pp. 7-1-7-7, Nov. 18, 1997.
Schoenenberger, J. G., "Telephones in the Sky", *J. of the British Institution of Radio Engineers, Institute of Electronic and Radio Engineers*, 1:81-89(2) Mar./Apr. 1989.
T. Pratt, C.W. Bostian: "*Satellite Communications*" 1986, John Wilen & Sons, New York, ISBN 0-471-859-66-4.
Iida, N., "Antenna Tracking Device," Satellite Communication, Ohmsha Ltd., Feb. 25, 1997, first edition, pp. 150-151.

* cited by examiner

*Primary Examiner*—Melur Ramakrishnaiah
(74) *Attorney, Agent, or Firm*—Sterne, Kessler, Goldstein & Fox P.L.L.C.

(57) ABSTRACT

A system for providing real-time television broadcasts to aircraft 4 via satellite 2 is described. The broadcast signal 11 is transmitted to the aircraft 4 together with a communications signal 10, forming part of an existing communications network air interface. The system separates the communications signal 10 from the broadcast signal 11 and enables the real-time broadcast to be displayed on-board the aircraft.

13 Claims, 4 Drawing Sheets

SYSTEM AND METHOD FOR PROVIDING BROADCAST SIGNALS TO AIRCRAFT

The invention relates to the provision of broadcast signals to aircraft. More specifically, but not exclusively, the invention relates to a method and apparatus for providing real-time satellite television broadcasts to aircraft globally.

Systems for providing real-time television broadcasts to aircraft have been proposed for domestic markets such as the United States of America, where Ku-band satellites transmit real-time television to aircraft moving over the domestic land mass. Ku-band satellites can be used as they offer good spot beam coverage over land masses. The aircraft receivers for the broadcast service are designed as autonomous systems consisting at least of an antenna, a mechanism for pointing and steering the antenna to the satellite, means for switching between satellites as the aircraft moves across different coverage areas, a receiver capable of receiving and tuning the broadcast signal and a demodulator/decoder for converting the received broadcast signal into a video signal for display by the on-board entertainment system.

Provision of such a service on a global basis has not been attainable due to the limited satellite gain on the satellite constellations that operate on a global basis, not just over the major land masses. This limited satellite gain requires a highly power efficient air-interface which would have to include highly efficient coding techniques such as turbo coding. Furthermore, the transmission system would have to use efficient data and video compression techniques for constraining the required data rate of the broadcast channel at a level that would comply with the satellite link budget. Additionally, methods for steering and pointing the on-board antenna would need to be devised for operation with relatively weak received signals.

Systems have been proposed, such as those disclosed in U.S. Pat. No. 5,436,656 and GB-A-2324395 where video broadcast data is transmitted via a relay satellite that is used by the aircraft's on-board telephony transmissions. However, it is a disadvantage of these systems that additional communications equipment and different, more complex antenna must be installed on the aircraft at considerable expense.

According to one aspect of the invention there is provided a system for providing real-time broadcasts to aircraft comprising transmitting means for transmitting real-time broadcast signals in a broadcast channel to an aircraft, receiving means for receiving said broadcast signals on the aircraft and decoding means for decoding said broadcast signal in which the transmitting means and the receiving means additionally transmit and receive communications signals in a separate channel, the decoding means acting to separate the broadcast signals from the communications signals.

According to another aspect of the invention there is further provided apparatus for receiving real-time broadcasts on aircraft, said apparatus comprising decoding means for separating data relating to the broadcast from other data contained within a signal received on-board the aircraft, in which the broadcast data comprises a signal allocated a frequency sub-band separate from the frequency sub-band allocated to the signal comprising the other data.

According to another aspect of the invention there is also provided a method of providing real-time broadcasts to aircraft comprising the steps of transmitting a signal via a satellite to an aircraft, the signal including communications data and broadcast data, receiving the signal on-board the aircraft, separating the broadcast data from the communications data and processing the broadcast data so as to distribute the broadcast on-board the aircraft.

In this way, it is possible for aircraft to receive real-time broadcast signals globally, without the necessity of fitting complex additional communications systems to the airframe.

The invention will now be described with reference to the following drawings in which.

The Inmarsat™ satellite constellation provides mobile satellite communications services to maritime, aeronautical and land-mobile services. The Inmarsat aeronautical service has been in existence for over 13 years and includes services for low data rate, Aero-L (1.2 kb/s), low data rate and near toll quality voice service, Aero-I (2.4 kb/s) and medium data rate and toll quality voice service (10.5 kb/s) Aero-H.

Figure 1:
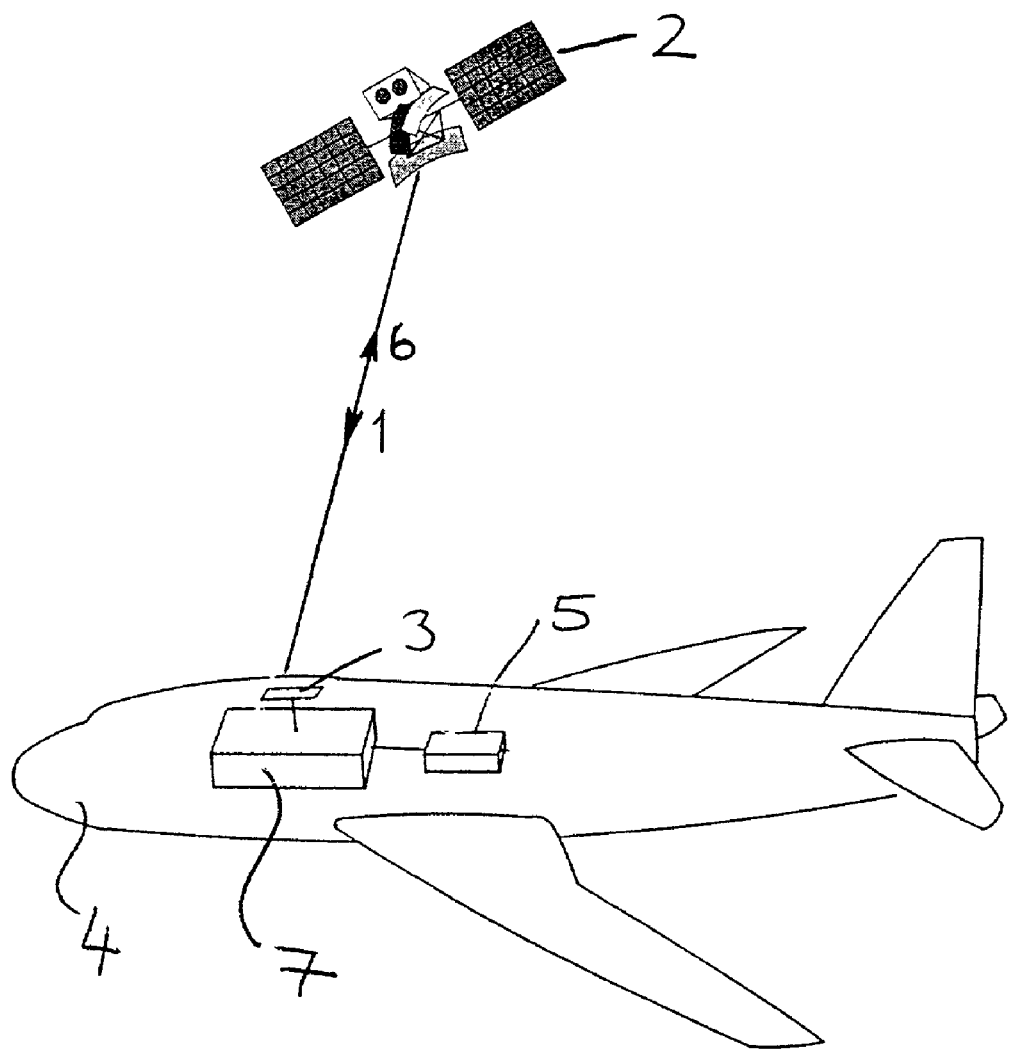
FIG. 1 is a known communications system allowing communication between a satellite and an aircraft.

FIG. 1 shows a schematic diagram of the Aero-H system. Earth stations (not shown) transmit data in channels to satellites within a satellite constellation. One such satellite 2 is shown in FIG. 1. Outbound channels 1 are transmitted by the satellite 2 and are received by an antenna 3 on-board an aircraft 4 flying within the coverage area of the satellite 2. The channels 1 received by the antenna 3 are processed by a communications subsystem 5, which decodes, demodulates and distributes the channels to communications equipment on-board the aircraft 4. Inbound channels 6 from the communications equipment are encoded and modulated by the communications subsystem 5 for transmission via the antenna 3 to the satellite 2.

The communications subsystem 5 also controls other mechanisms 7 such as those for steering and pointing the antenna 3 at the satellite 2 and for switching between satellites when the aircraft passes from one satellite coverage area to the next.

The Aero-H system consists of four channel types: an outbound TDM and system information broadcast channel (P-channel); an inbound packet reservation channel (T-channel); an inbound packet burst channel (R-channel); and a circuit mode traffic channel (C-channel).

It will be appreciated that this is a brief and simplified description of the Inmarsat™ Aero-H system. A fuller description is disclosed in the Inmarsat Aero-H System Definition Manual hereby incorporated by reference.

Figure 2:
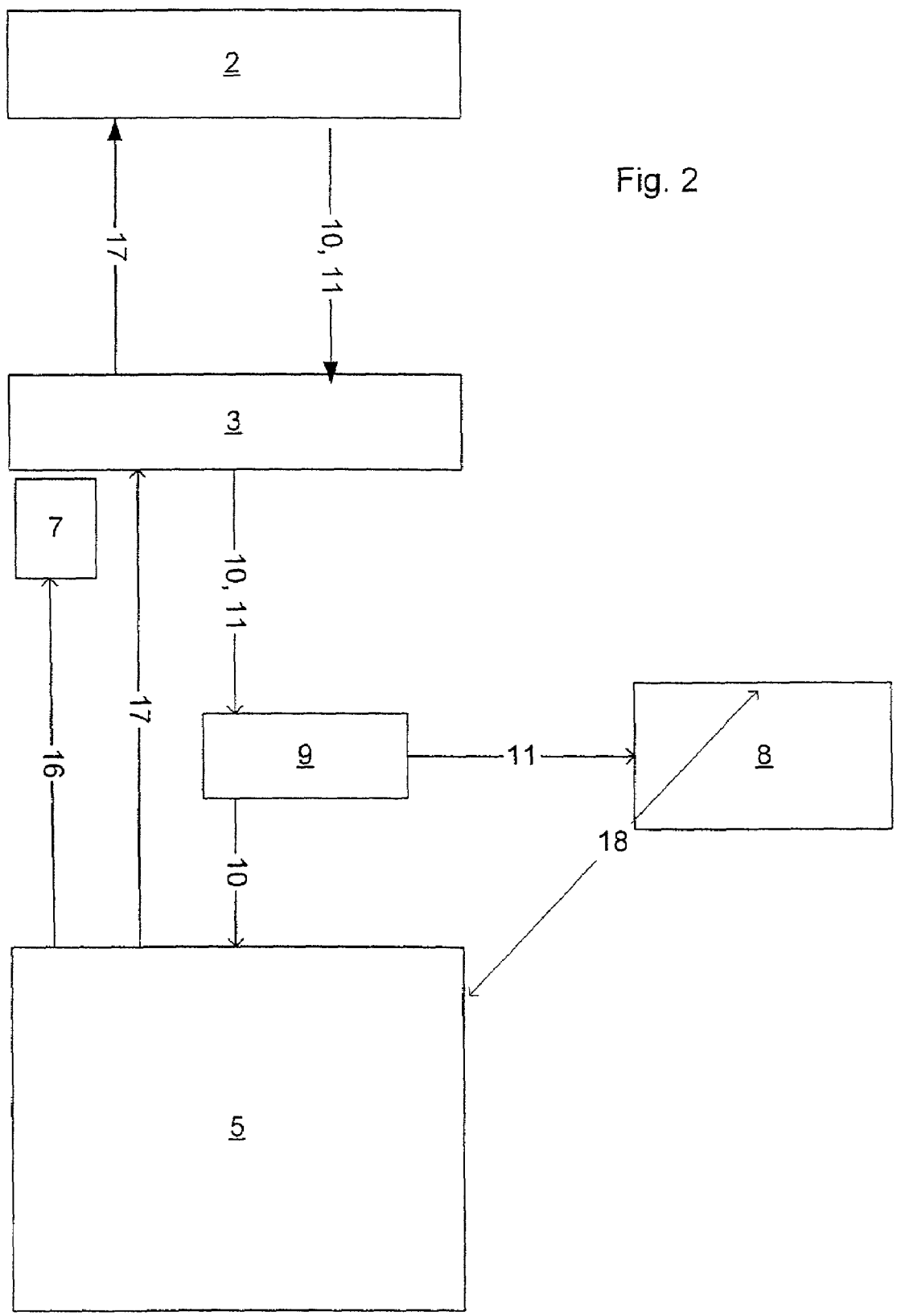
FIG. 2 is a schematic block diagram of one form of system in accordance with the invention showing an additional broadcast receiver subsystem incorporated in the known system of FIG. 1.
Figure 3:
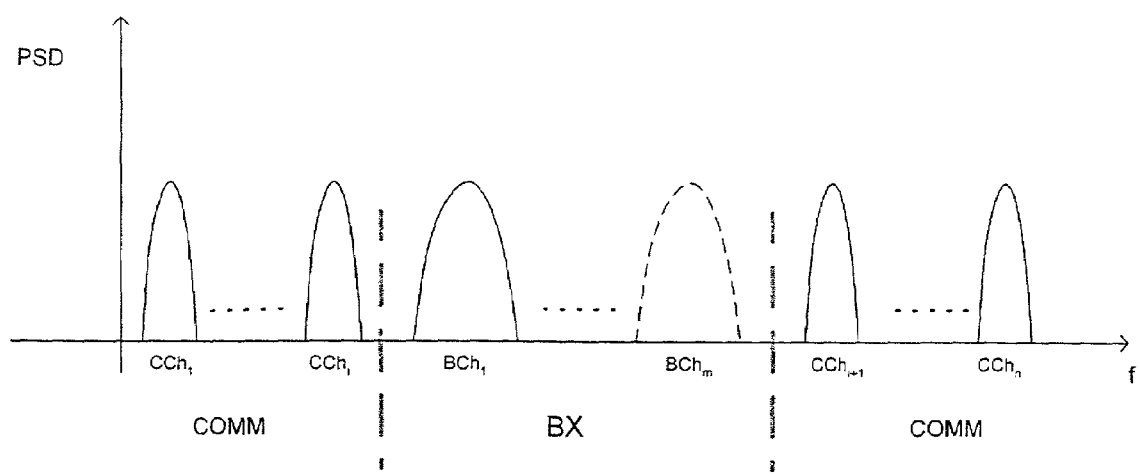
FIG. 3 is a graph of power spectral density against RF frequency showing one form of spectrum allocation for communications and broadcast signals.

FIG. 2 shows the Aero-H system as described above, further incorporating a broadcast receiver subsystem 8 and RF splitter 9. The outbound channels 1 comprise communications signals 10 and real-time broadcast signals 11. As shown for example in FIG. 3, the broadcast system channels $BCh_1$ to $BCh_m$ are allocated an RF frequency sub-band BX which is separate from the RF frequency sub-bands COMM for the communications channels $CCh_1$ to $CCh_n$. In this way, the broadcast system air-interface is separate and independent from the air-interface defined for the communications channels.

The real-time television broadcast system air-interface includes one or more TDM channels that multiplex one or more real-time broadcast programmes, and one or more types of media, for example video, audio, internet multimedia or control signals and control information.

Figure 4:
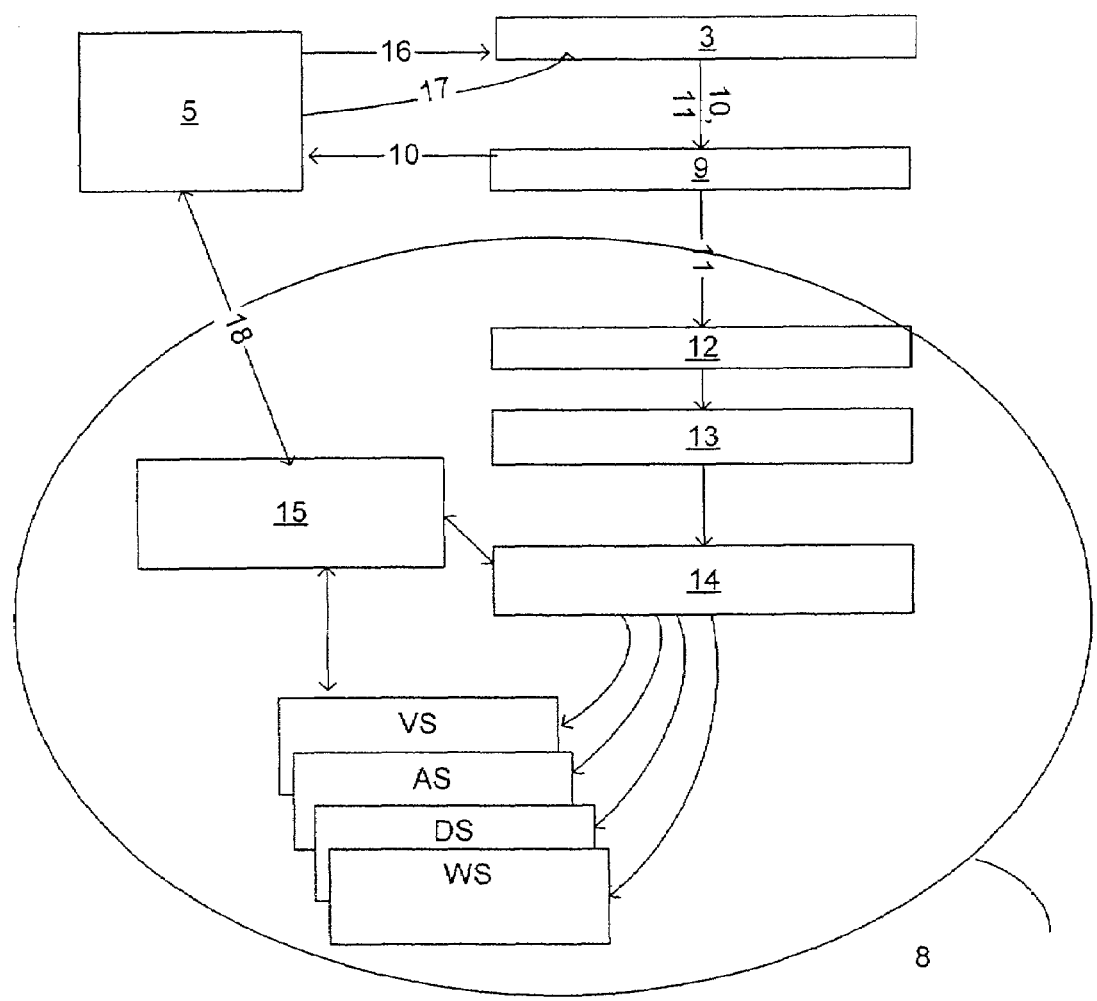
FIG. 4 is a block diagram of the broadcast receiver subsystem of FIG. 2 in more detail.

The incoming broadcast signal 11 is received by the antenna 3 and fed to the broadcast receiver subsystem 8 using a radio frequency (RF) splitter 9 close to the antenna 3. As shown in FIG. 4, the broadcast RF signal 11 transmitted by the RF splitter 9 to the broadcast receiver subsystem 8 is downconverted by an RF/IF down converter 12 and transmitted to a modem 13 which demodulates and decodes the signal. At this point the signal may comprise multiplexed data and compressed media content. The signal is then demultiplexed by suitable demultiplexing means 14 into component parts such as compressed video and audio, datagrams, web content and any other format as contained in the broadcast signal and decompressed as necessary. The decompressed, demultiplexed signals are then distributed as required to the appropriate servers, such as video server VS, audio server AS, datagram server DS and web server WS, under the control of an on-board management and control module 15.

The communications signal 10 is received by the antenna 3 and fed by the RF splitter 9 to the communications subsystem 5 where it is decoded, demodulated and distributed to communications terminals on-board the aircraft. The communications terminals transmit communications channels 17 which are encoded and RF modulated by the communications subsystem 5, and transmitted through the antenna 3 to the satellite 2.

The communications subsystem 5 detects the signal strength of the communications signal 10 and controls the pointing of the antenna 3, by means of a control signal 16 input to the control mechanism 7, so as to keep the signal strength at a maximum. The mechanism for controlling the pointing of the antenna 3 is already in use in Inmarsat Aero receivers and need not be described further.

The broadcast receiver subsystem 8 may include a communications terminal which sends communication signals 18 through the communications subsystem 5, so as to be included in the transmitted communications channels 17. The communications signals 18 may be used to control the broadcast content transmitted in the broadcast signal 11.

As the broadcast signal is transmitted through the same satellites of the constellation as the communications channels serving the aircraft, the antenna tracking and control functions can be dealt with via the communications subsystem on-board the aircraft. For this reason, no additional antenna control or tracking mechanisms are required.

In this way, real-time television broadcasts can be transmitted to aircraft globally. The broadcast receiver subsystem 8 makes use of the preexisting antenna and communications subsystem. Transparency between the communication and broadcast signals is maintained by separating the frequencies of the two systems and maintaining the independence of the two systems' air-interfaces.

The real-time broadcast system is a passive user of part of the communications system that already exists on aircraft. In this way, significant simplification and cost reduction can be achieved whilst improving the possibility of receiving real-time broadcasts globally.

It will be appreciated that although this invention has been described with reference to the Inmarsat Aero-H aeronautical communications system, the invention may be used with any other satellite-based aeronautical communications system.

Furthermore, the broadcast signal may include other forms of media and need not be limited to the media described above. Furthermore, other television broadcasts may be received that need not be real-time broadcasts. The use of a TDMA format for the broadcast air interface is not essential; for example, an SCPC format may be used.

The invention claimed is:

1. Apparatus for receiving signals transmitted by a satellite, including:
   a. an antenna for receiving said signals;
   b. a communications demodulator, connected to said antenna, for demodulating one or more communications channels among said signals;
   c. and a broadcast demodulator, separate from said communications demodulator and connected to said antenna, for demodulating one or more broadcast channels among said signals, wherein said one or more communications channels are separate in frequency from said broadcast channels, and the apparatus further includes a frequency splitter for separating said communications channels and said broadcast channels, directing the separated communications channels to said communications demodulator, and directing the separated broadcast channels to said broadcast demodulator.

2. Apparatus according to claim 1, wherein said antenna is a directional antenna, the apparatus further including means for steering said antenna to point towards a signal source according to a property of the one or more communications channels demodulated by the communications demodulator.

3. Apparatus according to claim 2, wherein said property is a signal strength of said one or more communications channels.

4. Apparatus according to claim 1, including a communications modulator connected to said antenna, for receiving and modulating communications signals received from one or more communications terminals and transmitting said modulated communications signals through said antenna.

5. Apparatus according to claim 4, wherein at least one of said communications terminals is a broadcast control terminal for transmitting broadcast control signals so as to control the content of said broadcast channels.

6. Apparatus according to claim 5, including means for decoding said one or more communications channels and distributing said decoded communications channels to said one or more communications terminals.

7. Apparatus according to claim 4, including means for decoding said one or more communications channels and distributing said decoded communications channels to said one or more communications terminals.

8. Apparatus according to claim 1, including means for decoding said demodulated one or more broadcast channels and distributing said one or more broadcast channels to one or more broadcast content servers.

9. Apparatus according to claim 1, wherein said antenna is a satellite communications antenna.

10. An aircraft including apparatus according to claim 1.

11. Apparatus according to claim 1, wherein said antenna is a directional antenna, the apparatus further including means for steering said antenna to point towards a signal source according to a property of the one or more communications channels demodulated by the communications demodulator.

12. Apparatus for receiving real-time broadcasts on aircraft, said apparatus comprising decoding means for separating broadcast data from other data contained within a signal received on-board the aircraft, in which the broadcast data comprises a signal allocated a frequency sub-band separate from the frequency sub-band allocated to the signal comprising the other data, wherein the decoding means is operable to separate the data relating to the broadcast from the other data by splitting the signal received on-board the aircraft into signals in the respective frequency sub-bands, and the decoding means is further operable to direct the signals in the respective frequency sub-bands to a respective demodulator.

13. A method of providing real-time broadcasts to aircraft comprising the steps of:

transmitting a signal via a satellite to an aircraft, the signal including communications data and broadcast data, wherein the communications data is separate in frequency from the broadcast data;

receiving the signal on-board the aircraft;

separating the broadcast data from the communications data; and processing the separated broadcast data so as to distribute the broadcast on-board the aircraft.

* * * * *

UNITED STATES PATENT AND TRADEMARK OFFICE
CERTIFICATE OF CORRECTION

PATENT NO. : 7,634,268 B2 Page 1 of 1
APPLICATION NO. : 10/021249
DATED : December 15, 2009
INVENTOR(S) : Trachtman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2631 days.

Signed and Sealed this

Ninth Day of November, 2010

David J. Kappos
*Director of the United States Patent and Trademark Office*